(12) United States Patent
Bellemare

(10) Patent No.: US 8,033,619 B2
(45) Date of Patent: Oct. 11, 2011

(54) ENDLESS TRACK

(75) Inventor: Martin Bellemare, Drummondville (CA)

(73) Assignee: Soucy International Inc., Drummondville (CA)

( * ) Notice: Subject to any disclaimer, the term of this patent is extended or adjusted under 35 U.S.C. 154(b) by 191 days.

(21) Appl. No.: 12/413,677

(22) Filed: Mar. 30, 2009

(65) Prior Publication Data

US 2009/0195061 A1    Aug. 6, 2009

(30) Foreign Application Priority Data

Apr. 2, 2008    (CA) ...................................... 2628201

(51) Int. Cl.
   *B65D 57/00*     (2006.01)
   *B62D 55/24*     (2006.01)
(52) U.S. Cl. ........................................ 305/195; 305/178
(58) Field of Classification Search .................. 305/116, 305/157, 165, 173–174, 193, 195, 178, 180
   See application file for complete search history.

(56) References Cited

U.S. PATENT DOCUMENTS

| | | | | |
|---|---|---|---|---|
| 5,013,286 A * | 5/1991 | Breher | ........................ | 474/205 |
| 5,484,321 A * | 1/1996 | Ishimoto | ...................... | 446/433 |
| 6,793,296 B2 * | 9/2004 | Deland et al. | ................. | 305/167 |
| 6,869,153 B2 * | 3/2005 | Wright et al. | ................. | 305/169 |
| 7,090,312 B2 * | 8/2006 | Soucy et al. | .................. | 305/160 |
| 7,114,788 B2 * | 10/2006 | Deland et al. | ................. | 305/157 |
| 7,784,884 B2 * | 8/2010 | Soucy et al. | .................. | 305/175 |
| 7,866,767 B2 * | 1/2011 | Lemaire et al. | ............... | 305/178 |
| 2004/0232765 A1 * | 11/2004 | Delisle | ......................... | 305/178 |
| 2005/0200200 A1 * | 9/2005 | Fukushima | .................. | 305/173 |
| 2009/0256418 A1 * | 10/2009 | Uchida | ......................... | 305/169 |

* cited by examiner

*Primary Examiner* — Jason Bellinger
(74) *Attorney, Agent, or Firm* — François Cartier; Robert Brouillette; Brouillette & Partners

(57) ABSTRACT

An elastomeric endless track for use on tracked vehicles or with wheel replacing traction assemblies is provided. The track generally comprises a ground-engaging outer surface provided with traction lugs generally disposed longitudinally according to a traction lug pitch, and a wheel-engaging inner surface provided with drive lugs disposed longitudinally according to a drive lug pitch and guide lugs disposed longitudinally according to a guide lug pitch. Such a track comprises the feature of having the guide lug pitch and/or the length of the guide lugs chosen so as to reduce the distance between consecutive guide lugs in order to reduce and/or prevent occurrences of detracking.

20 Claims, 11 Drawing Sheets

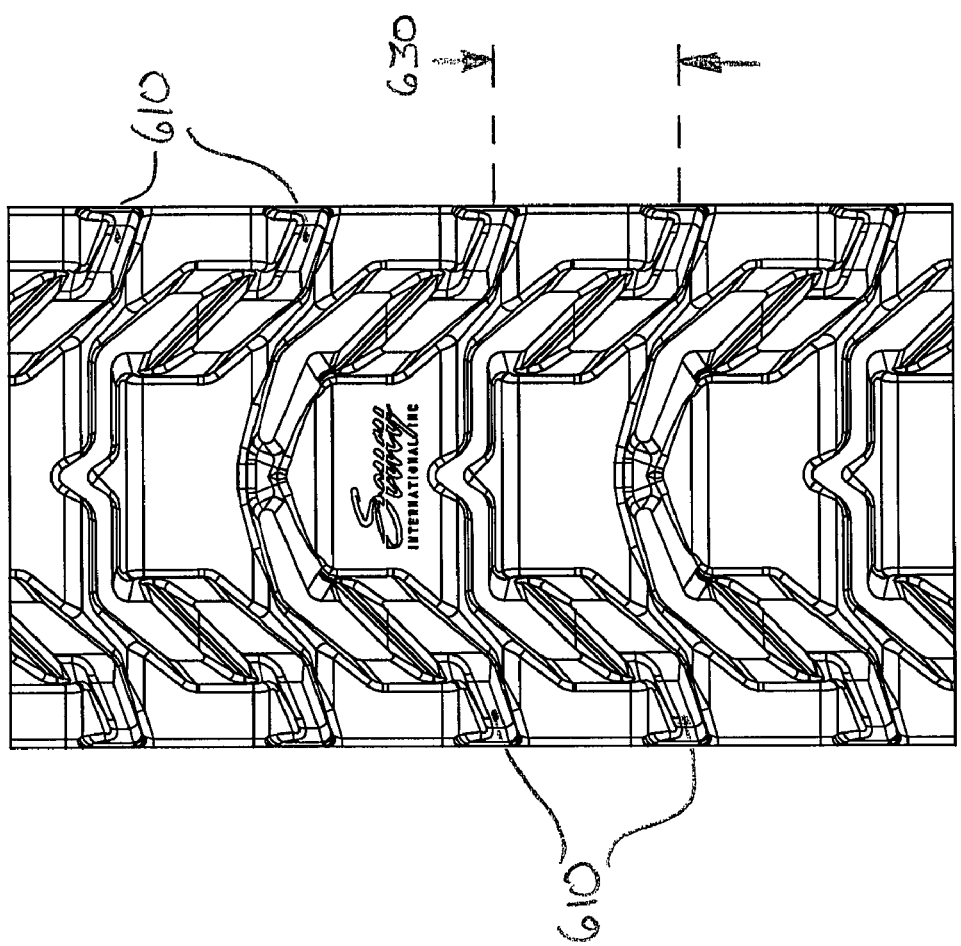

ENDLESS TRACK

CROSS-REFERENCE TO RELATED APPLICATIONS

The present patent application claims the benefits of priority of commonly assigned Canadian Patent Application No. 2,628,201, entitled "ENDLESS TRACK" and filed at the Canadian Intellectual Property Office on Apr. 2, 2008.

FIELD OF THE INVENTION

The present invention generally relates to tracked vehicles which use elastomeric tracks for propulsion. More particularly, the present invention relates to the elastomeric tracks used to propel such tracked vehicles. Without being limitative in nature, the present invention particularly relates to elastomeric tracks used to propel small personal all-terrain vehicles (hereinafter "ATV" or "ATVs") such as, but not limited to, snowmobiles and quads. Still, the present invention could also be applicable for tracks used on larger tracked vehicles such as, but not limited to, agricultural, construction, forestry and military vehicles.

BACKGROUND OF THE INVENTION

Conventionally, elastomeric tracks used on tracked vehicles are composed of a main elastomeric track body having reinforcing elements embedded therein. The reinforcing elements may come in a variety of forms such as reinforcing web or fabric, reinforcing cables or strips and stiffening rods.

Endless tracks also generally define a ground-engaging outer surface and a wheel-engaging inner surface. Typically, the outer surface is provided with a tread pattern of ground-engaging traction lugs. The pattern and the shape of the traction lugs are generally designed for particular conditions of operation and therefore can vary according to the weight of the vehicle and to the terrain upon which the vehicle is designed to be operated.

For its part, the inner surface is generally adapted to cooperate with a sprocket wheel, with one or more sliding rails and/or with road and/or idler wheels. In that sense, the inner surface is typically provided with drive lugs adapted to engage and/or cooperate with the sprocket wheel in order to transmit power from the sprocket wheel to the track. The inner surface is also advantageously provided with guide lugs which are generally adapted to guide the track, to prevent lateral movements and to prevent occurrences of detracking. Generally, but by no means in all cases, the guide lugs are not used to drive to the track.

Typically, the drive lugs and the guide lugs are laterally aligned along lug areas between which extend lug-less hinge areas.

However, the aforementioned conventional endless track suffers from still being prone detracking occurrences, particularly when the track is subjected to high lateral forces. There is thus a need for an improved elastomeric endless track which generally mitigates the aforementioned and other drawbacks.

OBJECTS OF THE INVENTION

Accordingly, one of the main objects of the present invention is to provide an endless elastomeric track for use on tracked vehicles which generally decreases the occurrences of detracking.

Another object of the present invention is to provide an endless track wherein the distance between consecutive guide lugs is reduced and is preferably smaller than the distance between consecutive drive lugs.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The aforesaid and other objectives of the present invention are realized by generally providing a novel endless track wherein the guide lug pitch and/or the longitudinal length of the guide lugs are chosen so as to reduce the distance between consecutive guide lugs in order to reduce occurrences of detracking.

Typically, the endless track of the present invention extends longitudinally and defines a ground-engaging outer surface and a wheel-engaging inner surface. The outer surface generally comprises a tread pattern of traction lugs generally disposed according to a traction lug pitch.

The inner surface comprises one or more rows of longitudinally aligned drive lugs which are adapted to cooperate with a sprocket wheel. The drive lugs are generally longitudinally and regularly spaced apart according to a drive lug pitch. Typically, the drive lug pitch and the traction lug pitch are substantially similar and the traction lugs and the drive lugs are substantially aligned on lug areas.

Conventionally, the lug areas are the laterally extending areas along the track wherein the laterally extending stiffeners are inserted and/or disposed.

The inner surface also comprises one but preferably at least two rows of longitudinally aligned guide lugs. The guide lugs are generally longitudinally and regularly spaced apart according to a guide lug pitch.

In accordance with an aspect of the present invention, the guide lugs are provided with a guiding portion and a reinforcing rib or portion in order to increase their lateral rigidity.

According to a first exemplary embodiment of the present invention, the guide lug pitch is smaller than the drive lug pitch so that the number of guide lugs is increased and the distance between consecutive guide lugs is reduced, thereby providing a more continuous rampart which effectively reduces occurrences of detracking.

In accordance with an aspect of the first exemplary embodiment, the guide lug pitch is preferably, but not exclusively, equal to or smaller than half the drive lug pitch.

According to a second exemplary embodiment of the present invention, the guide lugs are made longer longitudinally so that the distance between consecutive guide lugs is reduced, thereby providing a more continuous rampart which effectively reduces occurrences of detracking.

Understandably, a track made in accordance with the present invention could advantageously combine both the smaller guide lug pitch and the longer guide lugs.

Preferably, but not exclusively, the track of the present invention is particularly adapted to be used on all-terrain vehicles.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 11 is a plan view of the outer surface of the endless track shown in FIG. 7.

DETAILED DESCRIPTION OF THE PREFERRED EMBODIMENT

Figure 1:
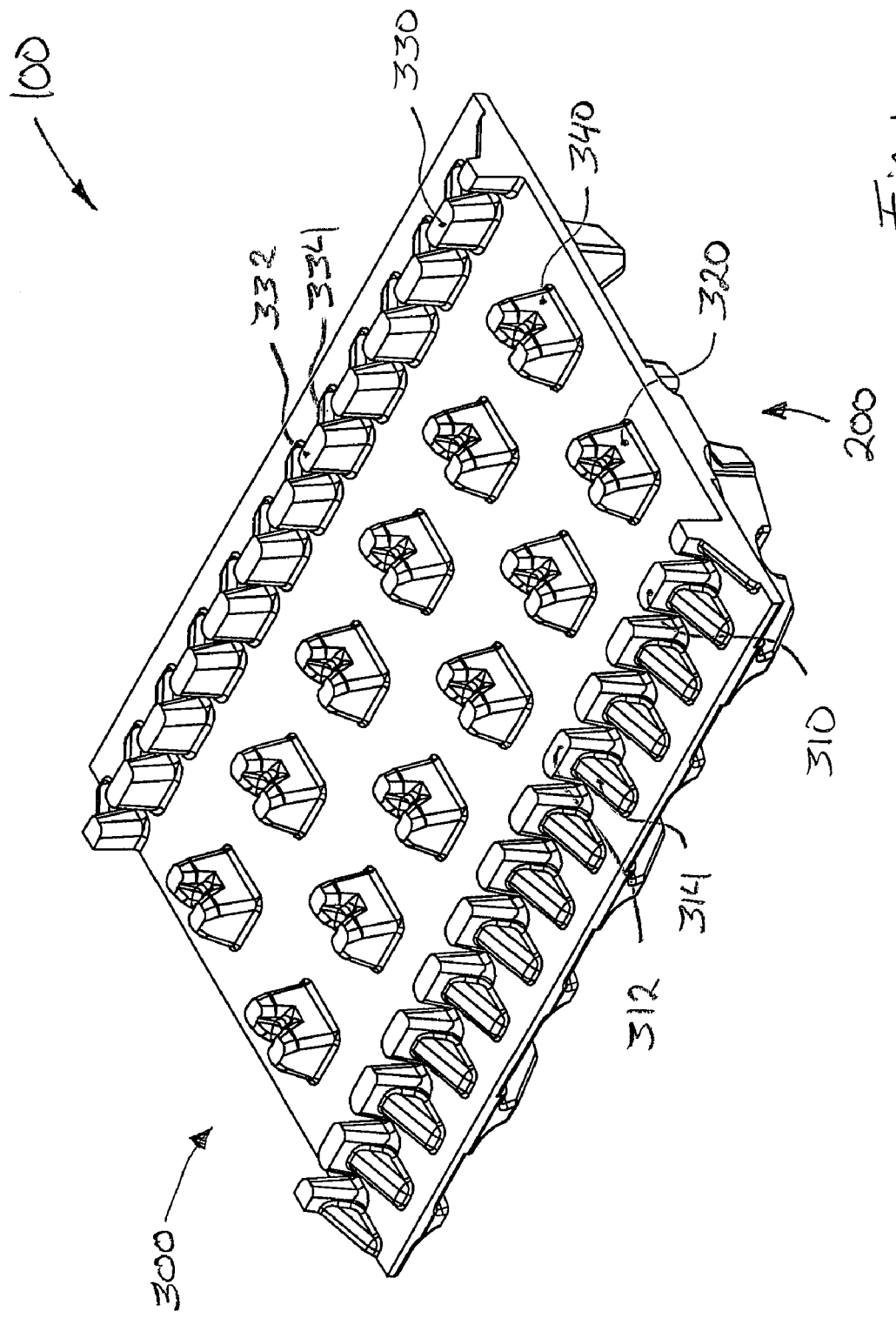
FIG. 1 is a fragmentary perspective view of the inner surface of a first exemplary embodiment of an endless track in accordance with the present invention.

A novel endless track will be described hereinafter. Although the invention is described in terms of specific illustrative embodiments, it is to be understood that the embodiments described herein are by way of example only and that the scope of the invention is not intended to be limited thereby.

Referring first to FIGS. 1 to 6, a first exemplary embodiment of the present invention is shown and generally referred to as endless track 100. The track 100 generally defines a ground-engaging outer surface 200, a wheel-engaging inner surface 300, a first lateral side or edge 102 and a second lateral side or edge 104.

Figure 3:
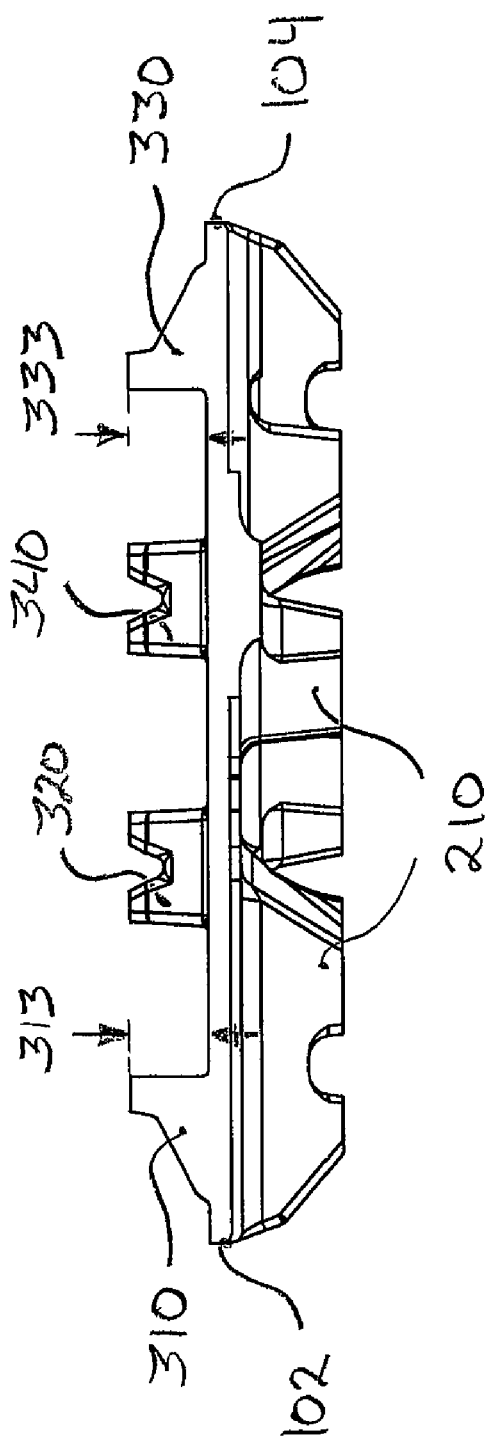
FIG. 3 is a cross-sectional longitudinal view of the endless track of FIG. 2, taken along line 3-3.
Figure 4:
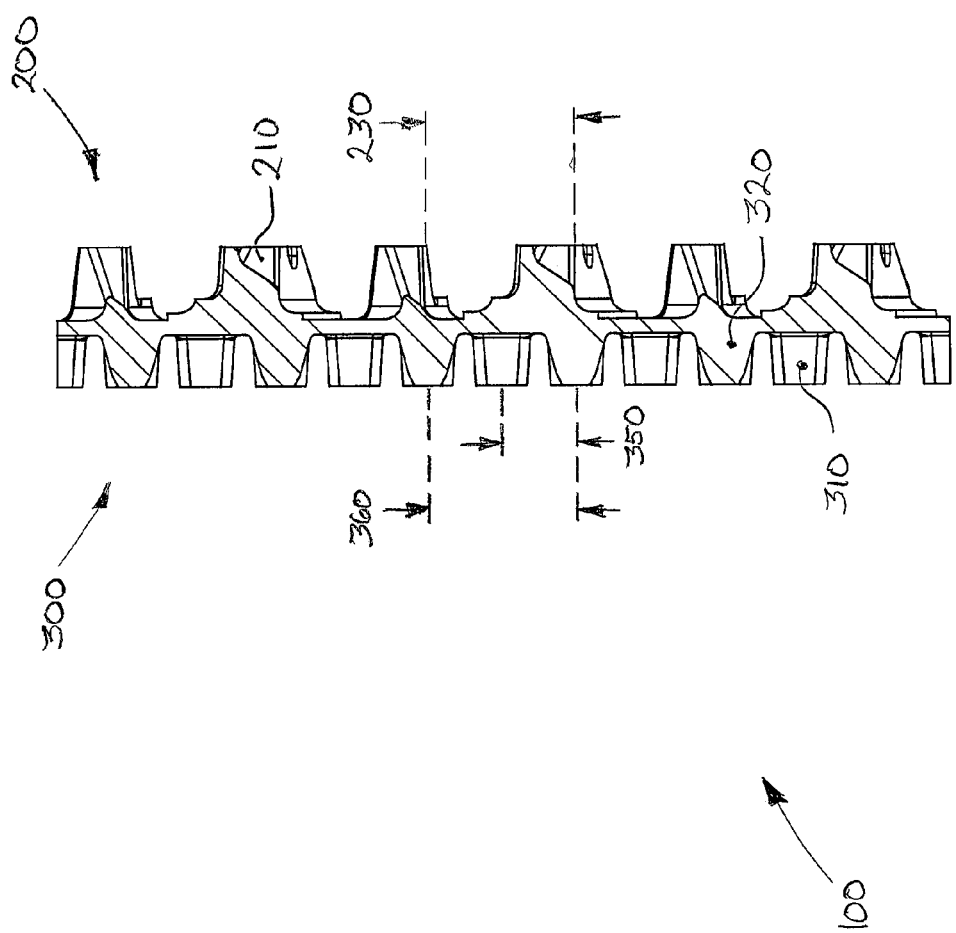
FIG. 4 is a cross-section side view of the endless track of FIG. 2, taken along line 4-4.
Figure 5:
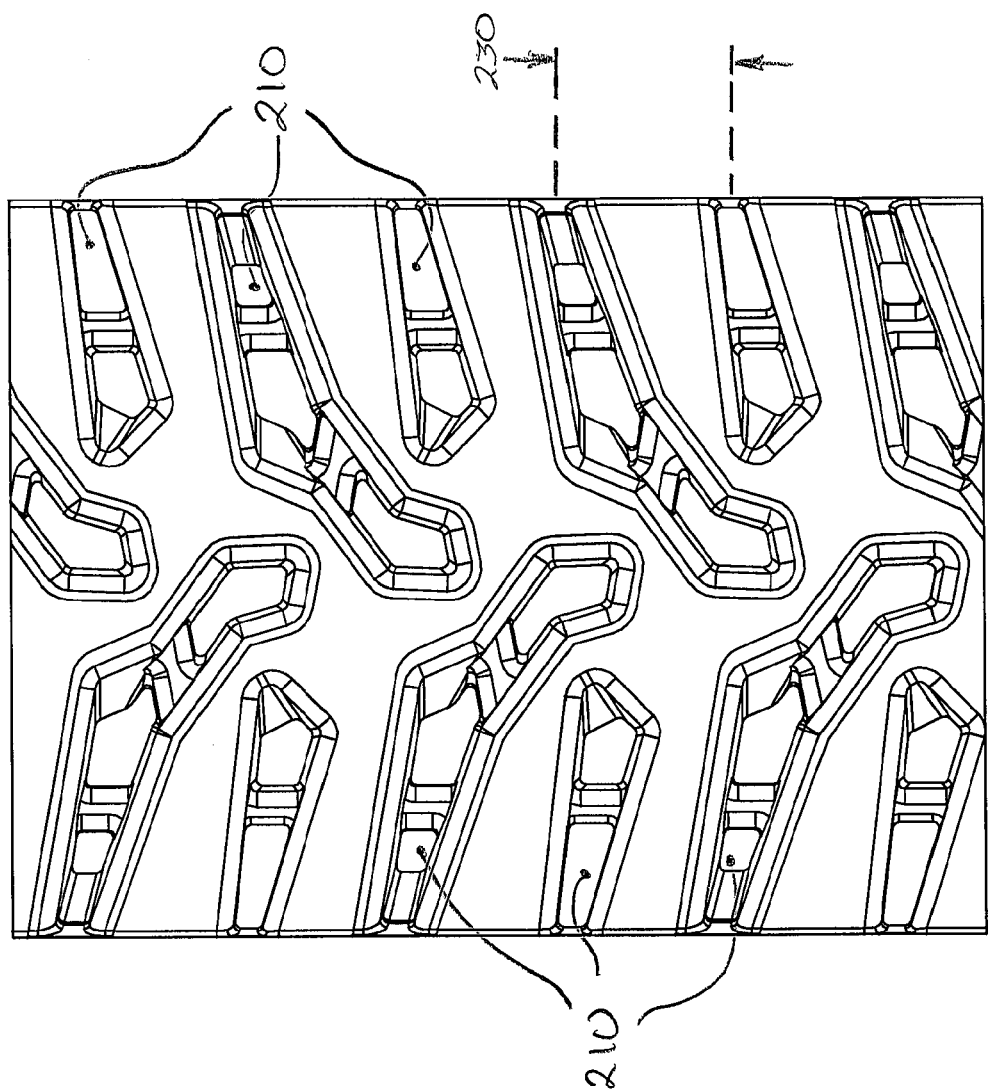
FIG. 5 is a plan view of the outer surface of the endless track shown in FIG. 1.
Figure 6:
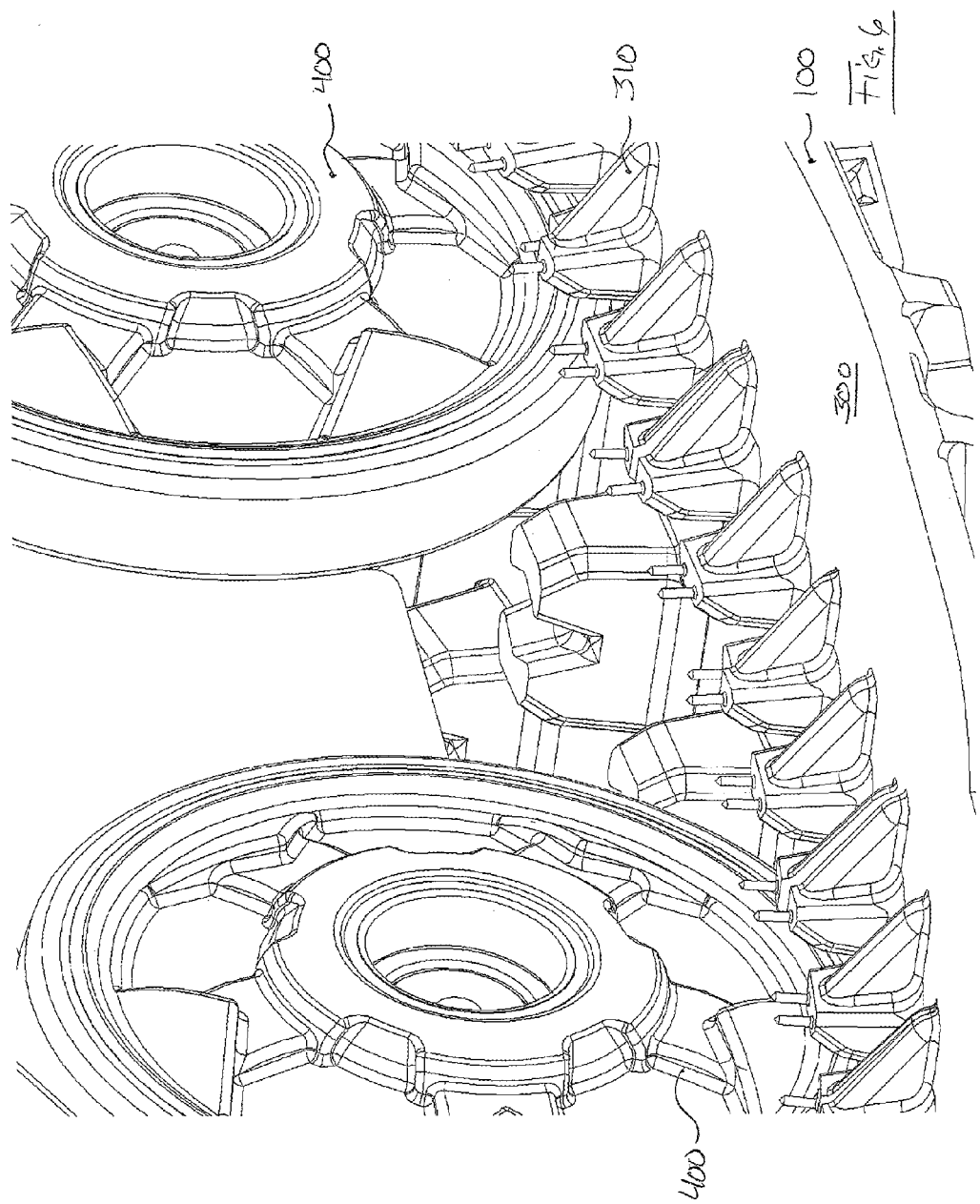
FIG. 6 is a fragmentary perspective view of the endless track of FIG. 1, mounted on an ATV.

As shown in FIGS. 3 to 5, the outer surface 200 generally comprises a plurality of laterally extending traction lugs 210. The traction lugs 210 are typically designed and configured to provide adequate traction between the track 100 and the ground. Preferably, and as best shown in FIGS. 4 and 5, the traction lugs 210 are longitudinally spaced apart along the circumference of the outer surface 200 and are preferably disposed according to a traction lug pitch 230.

Understandably, the shape and configuration of the traction lugs 210 can vary according to the type of surfaces over which the tracked vehicle is designed to travel and also generally according to the type of vehicles onto which the track 100 is mounted. The present invention is therefore not limited to the configuration of traction lugs 210 shown in the figures.

Figure 2:
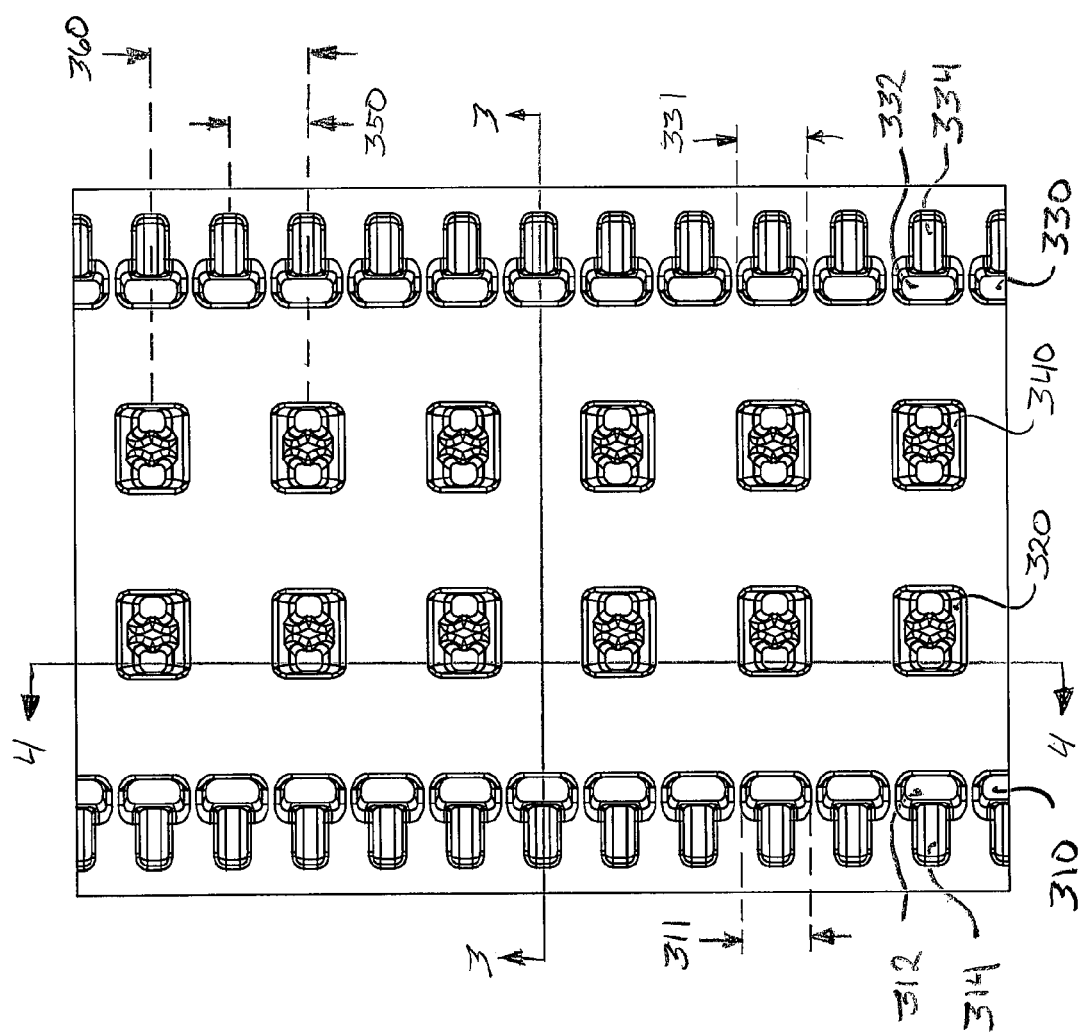
FIG. 2 is a plan view of the inner surface of the endless track shown in FIG. 1.

Referring now to FIGS. 1 to 3, the inner surface 300 of the endless track 100 preferably comprises drive lugs 320 and 340 and guide lugs 310 and 330. Typically, the drive lugs and the guide lugs are disposed in longitudinally aligned rows which are preferably laterally spaced apart in order to provide space for the wheels (see FIG. 6) and/or the sliding rails of the vehicle (not shown) onto which the endless track 100 is mounted.

The drive lugs 320 and 340 are generally configured to be engageable by the sprocket wheel (not shown) in order to efficiently transmit power from the sprocket wheel to the endless track 100. The guide lugs 310 and 330 are generally configured to provide guidance and lateral support to the track 100 when the latter is subjected to lateral forces.

As best shown in FIGS. 2 and 4, the drive lugs 320 and 340 are disposed along the circumference of the inner surface 200 and are longitudinally spaced apart according to a drive lug pitch 360. For their part, the guide lugs 310 and 330 are also disposed along the circumference of the inner surface 200 and are longitudinally spaced apart according to a guide lug pitch 350.

In accordance with an aspect of the present invention, the guide lug pitch 350 is smaller than the drive lug pitch 360. In certain embodiments, the guide lug pitch 350 is approximately equal to half the drive lug pitch 360. In certain other embodiments, the guide lug pitch 350 is smaller than half the drive lug pitch 360. In any case, by being disposed according to a smaller pitch 350, the guide lugs 310 and 330 are provided in greater number along the circumference of the inner surface 300 and the space or distance between consecutive guide lugs is reduced. Moreover, the space between consecutive guide lugs 310 or 330 is notably smaller than the space between consecutive drive lugs 320 or 340. Consequently, the guide lugs 310 and 330 define a more or less continuous rampart which substantially reduces occurrences of detracking.

Additionally, as shown in FIGS. 1 and 2, guide lugs 310 and 330 respectively comprise guiding portions 312 and 332 and reinforcing portions 314 and 334. The guiding portions 312 and 332 generally provide the surface onto the wheels and/or the sliding rails of the vehicle can abut or slide when the track is subjected to lateral forces whereas the reinforcing portions 314 and 334 generally provide additional lateral rigidity thereto.

As the skilled addressee would understand, the guide lugs 310 and 330 must generally be of sufficient size to prevent the sliding rails and/or the wheels to go over them and initiate detracking of the track 100. It has been found that detracking occurrences are satisfactorily reduced when the ratio between the height 313 and 333 of the guide lugs 310 and 330 (see FIG. 3) and the diameter of the wheel 400 (see FIG. 6) is at least 8% and most preferably at least 15%. Understandably, the height 313 and 333 of the guide lugs 310 and 330 must not be too high since it might negatively affect the proper functioning of the track 100. Hence, a trade-off must generally be found between reducing the occurrences of detracking and having a properly functioning track 100.

Referring now to FIGS. 7 to 11, a second embodiment of the present invention is shown and generally referred to as endless track 500. As for track 100, the track 500 generally defines a ground-engaging outer surface 600, a wheel-engaging inner surface 700, a first lateral side or edge 502 and a second lateral side or edge 504.

The outer surface 600 of the track 500 generally comprises a plurality of laterally extending traction lugs 610 which are typically designed and configured to provide adequate traction between the track 500 and the ground. Preferably, the traction lugs 610 are longitudinally spaced apart along the circumference of the outer surface 600 and are preferably disposed according to a traction lug pitch 630.

Figure 7:
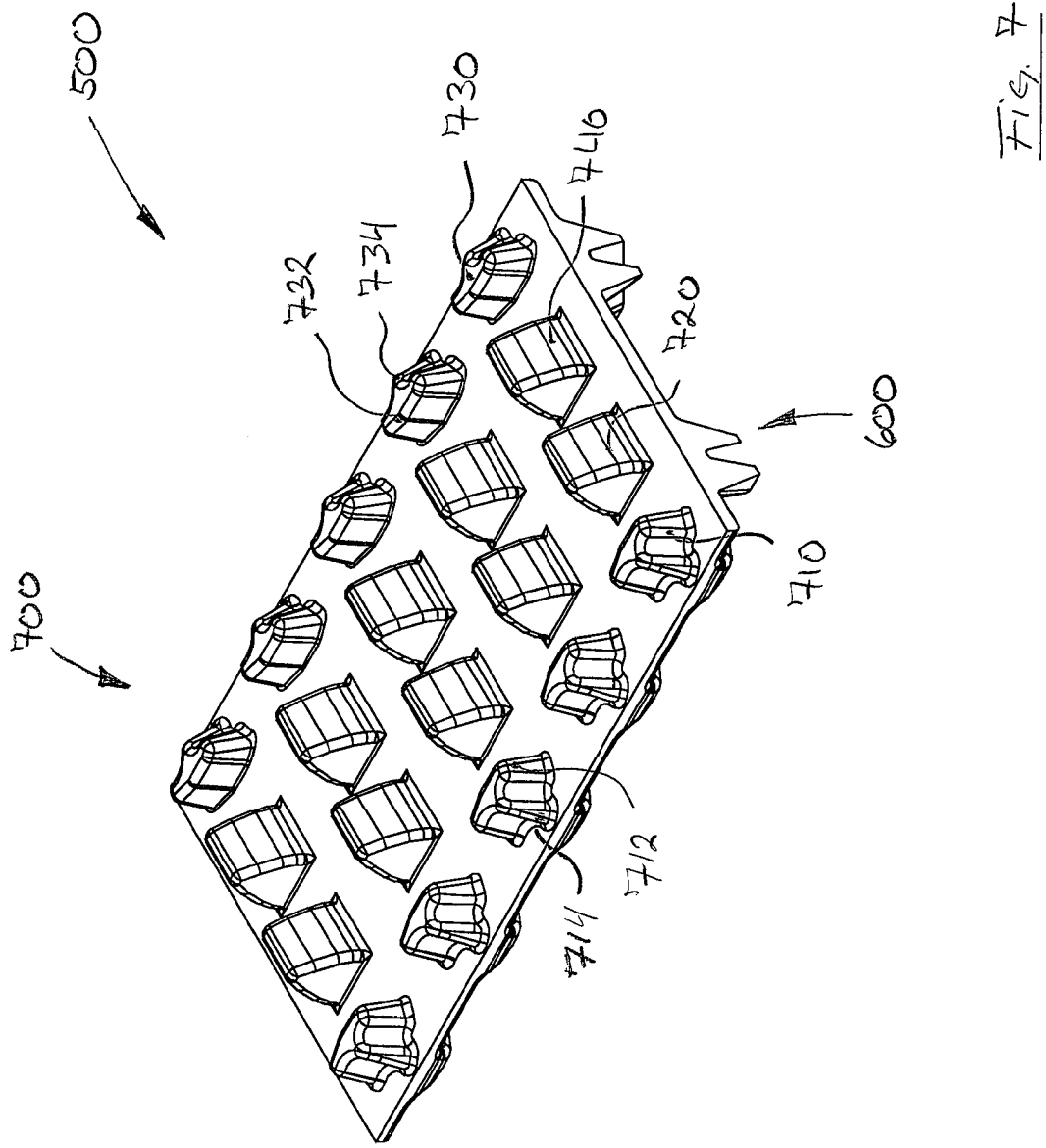
FIG. 7 is a fragmentary perspective view of the inner surface of a second exemplary embodiment of an endless track in accordance with the present invention.
Figure 8:
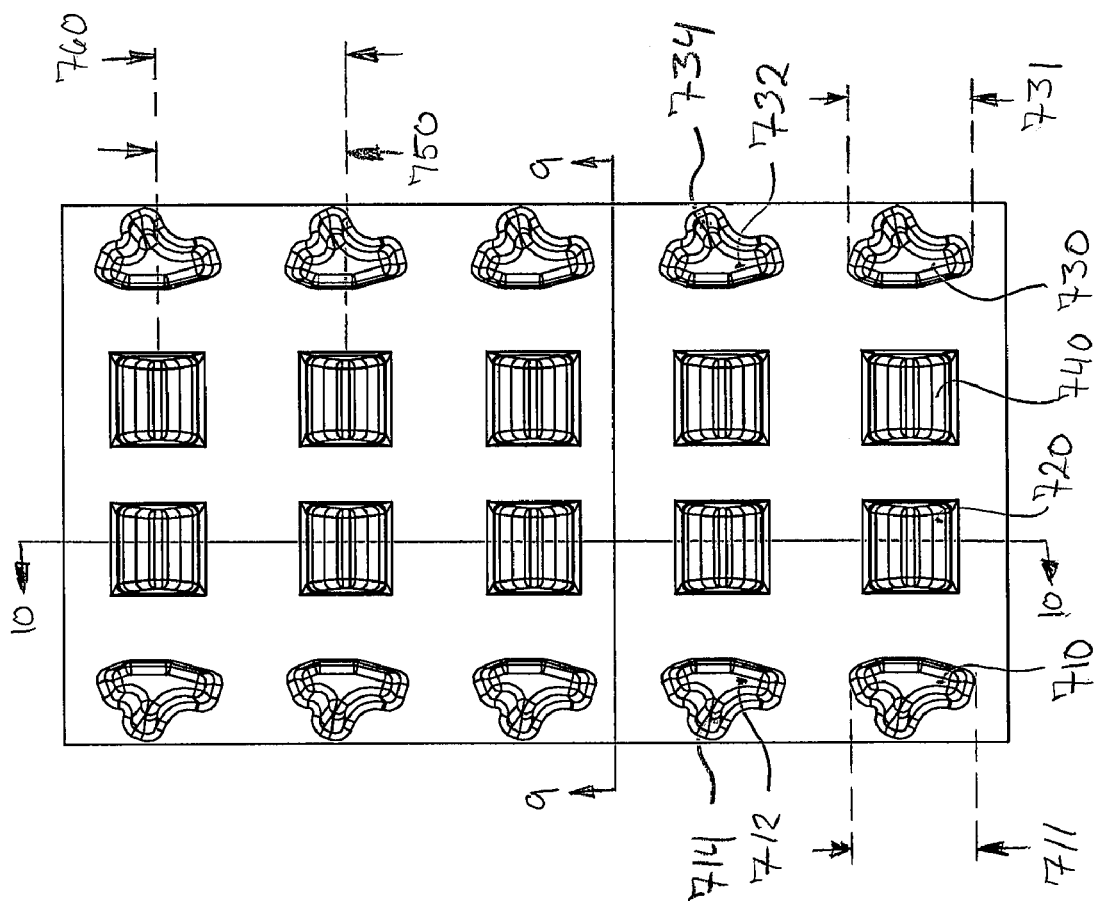
FIG. 8 is a plan view of the inner surface of the endless track shown in FIG. 7.
Figure 9:
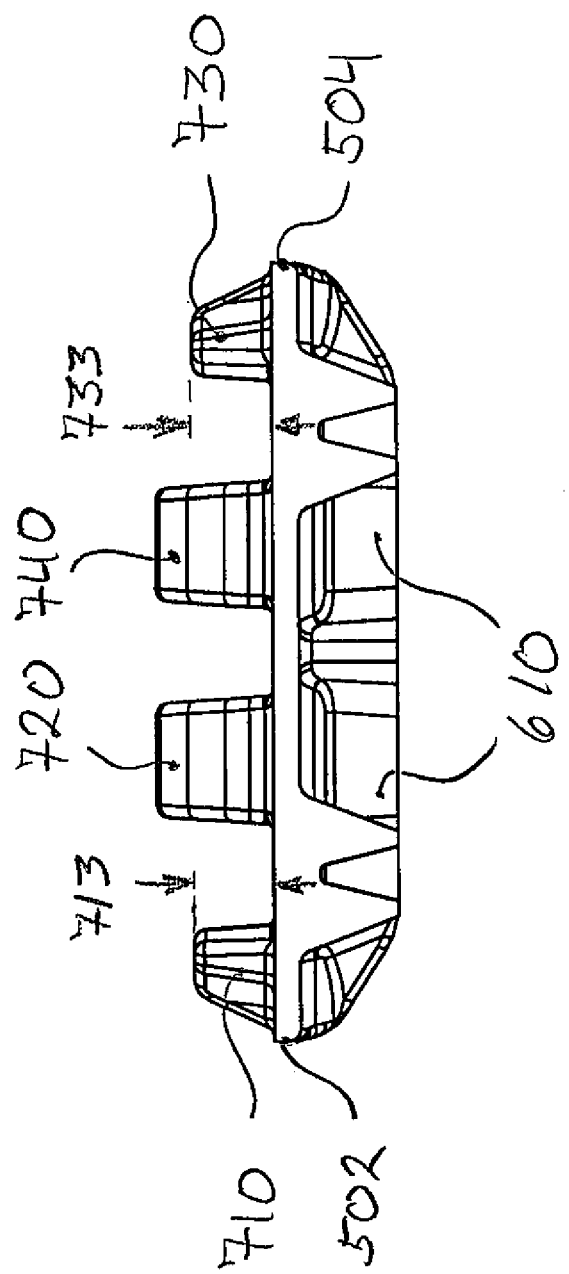
FIG. 9 is a cross-sectional longitudinal view of the endless track of FIG. 8, taken along line 9-9.

Referring now to FIGS. 7 to 9, the inner surface 700 of the endless track 500 comprises drive lugs 720 and 740 and guide lugs 710 and 730. Typically, the drive lugs and the guide lugs are disposed in longitudinally aligned rows which are preferably laterally spaced apart in order to provide space for the wheels and/or the sliding rails of the vehicle (not shown) onto which the endless track 100 is mounted. In that sense, the configuration of the inner surface 700 of the track 500 resembles the configuration of the inner surface 300 of the track 100.

As for drive lugs 320 and 340, the drive lugs 720 and 740 are generally configured to be engageable by the sprocket wheel (not shown) in order to efficiently transmit power from the sprocket wheel to the endless track 100. For their part, the guide lugs 710 and 730 are generally configured to provide guidance and lateral support to the track 500.

Figure 10:
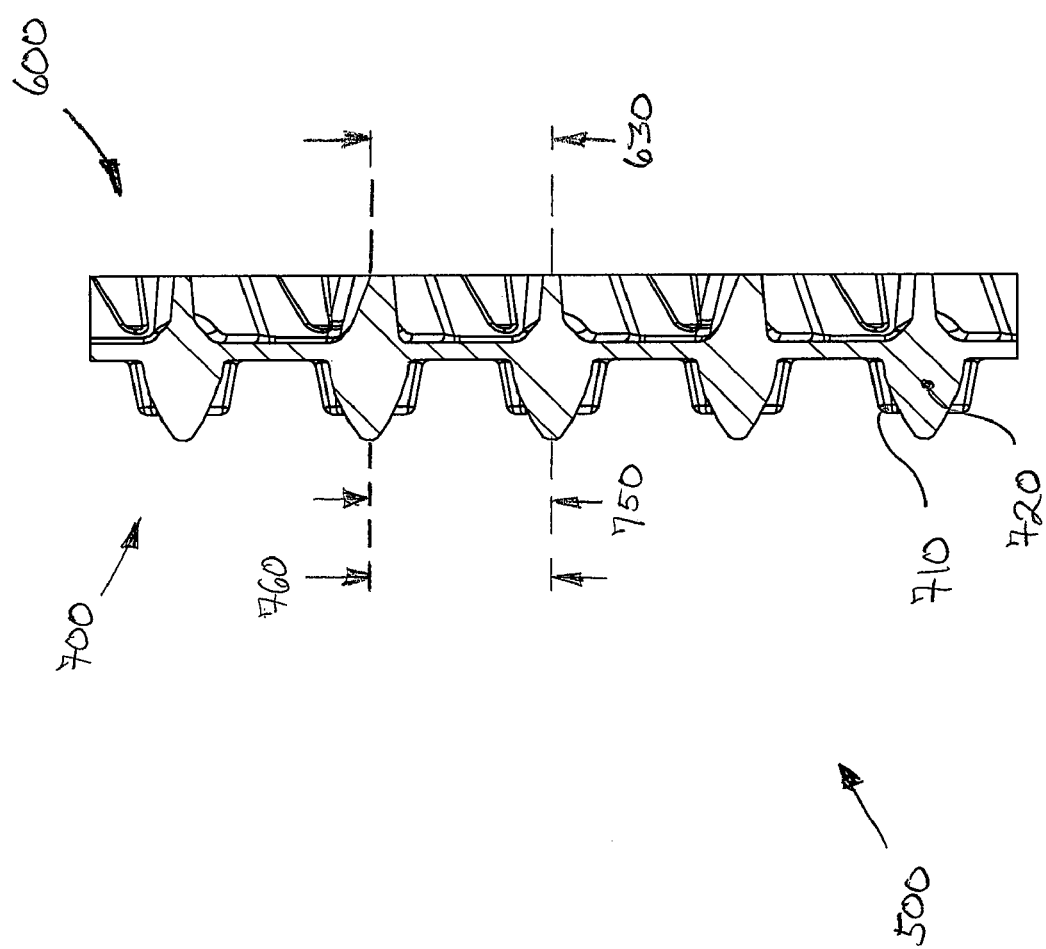
FIG. 10 is a cross-section side view of the endless track of FIG. 8, taken along line 10-10.

As best shown in FIGS. 8 and 10, the drive lugs 720 and 740 are disposed along the circumference of the inner surface 700 and are longitudinally spaced apart according to a drive lug pitch 760. For their part, the guide lugs 710 and 730 are also disposed along the circumference of the inner surface 700 and are longitudinally spaced apart according to a guide lug pitch 750.

Notably, in this second embodiment, the drive lug pitch 360 and the guide lug pitch 350 are substantially identical. However, as best shown in FIG. 8, the length 711 and 731 of the guide lugs 710 and 730 is greater than the length of the drive lugs 720 and 740. In other words, the guide lugs 710 and 730 extend longitudinally in the areas between consecutive drive and guide lugs which are typically free of lugs in prior art tracks.

By being provided longer than prior art guide lugs, the distance between consecutive guide lugs 710 or 730 is reduced thereby providing a more or less continuous rampart which substantially reduces occurrences of detracking.

Though provided with a shape different from the shape of the guide lugs 310 and 330, the guide lugs 710 and 730 also respectively comprise guiding portions 712 and 732 and reinforcing portions 714 and 734. The guiding portions 712 and 732 provide the surface onto the wheels and/or the sliding rails of the vehicle can abut or slide when the track is subjected to lateral forces whereas the reinforcing portions 714 and 734 generally provide additional lateral rigidity thereto.

As the skilled addressee would understand, as for the guide lugs 310 and 330, the ratio of the height 711, 731 of the guide lugs 710, 730 with respect to the diameter of the wheel is at least 8% and most preferably at least 15%. Understandably, the guide lugs 710 and 730 must not be too high since it could hinder the proper functioning of the track 500.

In accordance with the foregoing, it has been found that the length (311, 331 or 711, 731) of the guide lugs (310, 330 and 710, 730) and/or the guide lug pitch (350, 750) must be chosen so that the ratio of the cumulative length of the all the guide lugs (310, 330 or 710, 730) and/or fraction thereof present within a drive lug pitch (360 or 760) with respect to the drive lug pitch (360 or 760) is between 45% and 85% and most preferably between 55% and 65%. Hence, it is possible to fine tune this ratio by choosing a guide lug pitch smaller than the drive lug pitch, by selecting longer guide lugs or by combining both.

Example 1

In the first example, the track has a drive lug pitch of 2.526 in., a guide lug pitch of 1.263 in. and a guide lug length of 0.98 in. By having a guide lug pitch which is exactly half the drive lug pitch, the number of guide lugs present within a drive lug pitch is 2, which means that the ratio is 2 times 0.98 divided by 2.526. The ratio is 0.776 or 77.6%.

Example 2

In the second example, the track has a drive lug pitch of 2.526 in., a guide lug pitch of also 2.526 in. and a guide lug length of 1.39 in. By having a guide lug pitch which is equal to the drive lug pitch, the number of guide lugs present within the drive lug pitch is 1, which means that the ratio is 1 times 1.39 divided by 2.526. The ratio is 0.550 or 55.0%.

Understandably, by varying the guide lug pitch, the guide lug length or even both, it is possible to fine tune the aforementioned ratio. Hence, by providing an endless elastomeric track wherein the guide lug pitch is smaller than the drive lug pitch and/or wherein individual guide lugs are made longer, the endless track of the present invention is substantially less prone to detracking.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An endless track for use on a tracked vehicle, said track extending longitudinally and having a ground-engaging outer surface and a wheel-engaging inner surface, said outer surface comprising traction lugs, said inner surface comprising longitudinally spaced apart drive lugs, disposed according to a drive lug pitch, and longitudinally spaced apart guide lugs, disposed according to a guide lug pitch, wherein said guide lug pitch is smaller than said drive lug pitch.

2. An endless track as claimed in claim 1, wherein said guide lug pitch is approximately half said drive lug pitch.

3. An endless track as claimed in claim 1, wherein said guide lug pitch is smaller than half said drive lug pitch.

4. An endless track as claimed in claim 1, wherein at least one of said guide lugs comprises a guiding portion and a reinforcing portion.

5. An endless track as claimed in claim 1, wherein each of said guide lugs comprises a guiding portion and a reinforcing portion.

6. A track for propelling a vehicle on a ground surface, said track extending longitudinally and comprising an outer surface and an inner surface, said outer surface comprising traction lugs, and said inner surface comprising at least one row of longitudinally spaced apart drive lugs, and at least one row of longitudinally spaced apart guide lugs, wherein the number of guide lugs in the at least one row of guide lugs is greater than the number of drive lugs in the at least one row of drive lugs.

7. A track as claimed in claim 6, wherein said inner surface comprises a plurality of rows of longitudinally spaced apart drive lugs, wherein the number of drive lugs in each of said rows of drive lugs is smaller than the number of guide lugs in said at least one row of guide lugs.

8. A track as claimed in claim 6, wherein said inner surface comprises a plurality of rows of longitudinally spaced apart guide lugs, wherein the number of guide lugs in each of said rows of guide lugs is greater than the number of drive lugs in said at least one row of drive lugs.

9. A track as claimed in claim 6, wherein said drive lugs are longitudinally disposed according to a drive lug pitch, wherein said guide lugs are longitudinally disposed according to a guide lug pitch, and wherein said guide lug pitch is smaller than said drive lug pitch.

10. A track as claimed in claim 9, wherein said inner surface comprises at least two rows of longitudinally spaced apart drive lugs disposed according to said drive lug pitch.

11. A track as claimed in claim 9, wherein said inner surface comprises at least two rows of longitudinally spaced apart guide lugs disposed according to said guide lug pitch.

12. A track as claimed in claim 9, wherein said inner surface comprises two rows of longitudinally spaced apart drive lugs disposed according to said drive lug pitch, and two rows of longitudinally spaced apart guide lugs disposed according to said guide lug pitch.

13. A track as claimed in claim 9, wherein said guide lug pitch is approximately half said drive lug pitch.

14. A track as claimed in claim 9, wherein said guide lug pitch is smaller than half said drive lug pitch.

15. A track as claimed in claim 6, wherein at least one of said guide lugs comprises a guiding portion and a reinforcing portion.

16. A track as claimed in claim 6, wherein each of said guide lugs comprises a guiding portion and a reinforcing portion.

17. An endless track for propelling a vehicle on a ground surface, said track comprising an outer surface and an inner surface, said outer surface comprising traction lugs disposed along a circumference of said track, and said inner surface comprising at least one row of longitudinally spaced apart drive lugs disposed along said circumference of said track, and at least one row of longitudinally spaced apart guide lugs disposed along said circumference of said track, wherein the number of guide lugs in said at least one row of guide lugs is greater than the number of drive lugs in said at least one row of drive lugs.

18. A track as claimed in claim 17, wherein said drive lugs are longitudinally disposed according to a drive lug pitch, wherein said guide lugs are longitudinally disposed according to a guide lug pitch, and wherein said guide lug pitch is smaller than said drive lug pitch.

19. A track as claimed in claim 18, wherein said guide lug pitch is approximately half said drive lug pitch.

20. A track as claimed in claim 18, wherein said guide lug pitch is smaller than half said drive lug pitch.

\* \* \* \* \*